United States Patent [19]

Matsuo et al.

[11] Patent Number: 4,957,071
[45] Date of Patent: Sep. 18, 1990

[54] INTAKE SYSTEM FOR V-TYPE INTERNAL COMBUSTION ENGINE

[75] Inventors: Isaya Matsuo, Yokohama; Suehiro Urabe, Fujisawa; Eiichi Fujisawa, Yokohama, all of Japan

[73] Assignee: Nissan Motor Co., Ltd.

[21] Appl. No.: 384,610

[22] Filed: Jul. 25, 1989

[30] Foreign Application Priority Data

Jul. 26, 1988 [JP] Japan .............................. 63-97892[U]
Jul. 26, 1988 [JP] Japan .............................. 63-97893[U]

[51] Int. Cl.⁵ .......................................... F02M 35/00
[52] U.S. Cl. ............................................. 123/52 MV
[58] Field of Search ......... 123/52 M, 52 MC, 52 MB, 123/52 MV

[56] References Cited

U.S. PATENT DOCUMENTS

| | | | |
|---|---|---|---|
| 4,641,610 | 2/1987 | Rutschmann | 123/52 MV |
| 4,766,853 | 8/1988 | Iwanami | 123/52 M |
| 4,803,961 | 2/1989 | Hiraoka et al. | 123/52 M |
| 4,809,647 | 3/1989 | Masumoto et al. | 123/52 MB |
| 4,827,879 | 5/1989 | Ohmi et al. | 123/52 MV |
| 4,838,215 | 6/1989 | Yasuda et al. | 123/52 MB |

FOREIGN PATENT DOCUMENTS 0237823 10/1986 Japan .................................. 123/52 M
52-101820 12/1987 Japan .

*Primary Examiner*—David A. Okonsky
*Attorney, Agent, or Firm*—Pennie & Edmonds

[57] ABSTRACT

An intake system for a V-type internal combustion engine having two banks. The intake system is comprised of two sub-collectors disposed above the respective two banks of the engine and fluidly connected with cylinders in the banks. A main collector is disposed above and between the two banks of the engine and fluidly connected through a throttle device with the two sub-collectors. The main collector is supplied with air from an air filter. The throttle device is located at the rear end side of the engine and has throttle valves which respsectively control air flows to the two sub-collectors in response to operation of an accelerator pedal.

10 Claims, 7 Drawing Sheets

FIG. 7A *(PRIOR ART)*
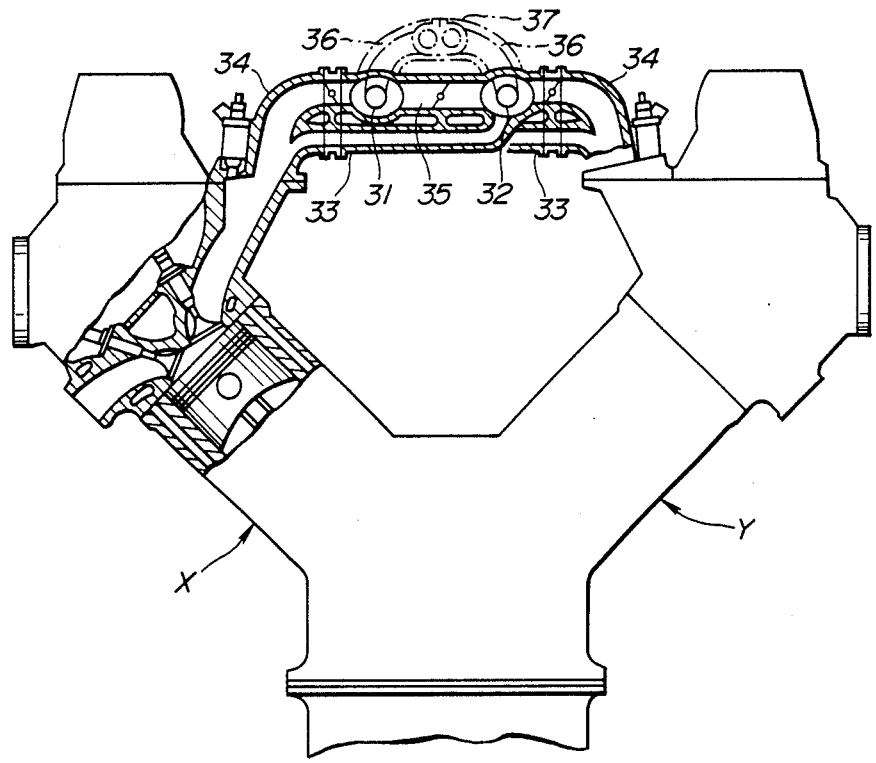
FIG. 7B *(PRIOR ART)*
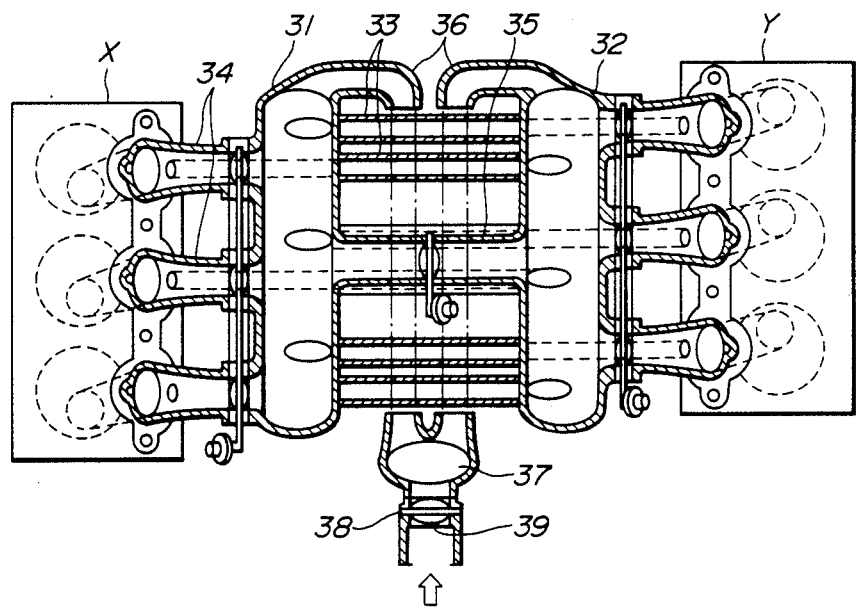

INTAKE SYSTEM FOR V-TYPE INTERNAL COMBUSTION ENGINE

BACKGROUND OF THE INVENTION

1. Field of the Invention

This invention relates to improvements in an intake system for a V-type internal combustion engine, employing inertia supercharging and resonance supercharging.

2. Background of the Invention

It is well known in the art to employ an intake air supply method in which intake air charging efficiency is improved under the effect of inertia supercharging and resonance supercharging. The inertia supercharging is caused by intake air pressure vibration which is generated such that negative pressure generated near intake ports at an air intake initial time propagates at sonic velocity toward the end of intake pipes and returns toward intake ports upon being converted to positive pressure wave. In other words, by matching the cycle of intake air pressure vibration and the cycle of intake valve opening and closing so that the positive pressure wave is transmitted to the intake valve immediately before closing of the intake valve, air generating the positive pressure wave is thrusted into the cylinder under its inertia.

The resonance supercharging is made by a pressure rise upon resonance which is caused when engine speed harmonizes with the resonance frequency of the whole intake system upon generating intake air vibration through a resonance pipe between two groups of cylinders which do not generate intake air interference with each other.

Such an intake system of the V-type engine, employing inertia supercharging and resonance supercharging is disclosed, for example, in Japanese Patent Provisional Publication No. 62-101820. This will be roughly discussed with reference to FIGS. 7A and 7B. In FIGS. 7A and 7B, two groups X, Y of cylinders are fluidly connected with two independent distribution chambers 31, 32 through long main air intake pipes 33 and short by-pass air intake pipes 34. Additionally, the respective two distribution chambers are fluidly connected with each other through a communication passage 35. Each by-pass air intake pipe 34 and the communication passage 35 are suitably opened and closed. The distribution chambers 31, 32 are fluidly connected with a gathering chamber 37 through air intake passages 36 which are independent to each other and extend from one end to the other end of each of the distribution chambers 31, 32. The gathering chamber 37 is provided with a throttle body having a throttle valve 39, in which intake air inducted through an air filter (not shown) is controlled in amount by the throttle valve 39 and thereafter introduced into the cylinders.

However, in the above conventional intake system of the V-type engine, the distribution chambers 31, 32 are disposed between the banks, and the communication passage 35 between the distribution chambers 31, 32 is disposed horizontally between the banks in such a manner as connect the distribution chambers 31, 32 at the longitudinal intermediate portions. Additionally, the main intake pipe 33 is also disposed horizontal between the banks. The thus arranged intake system has the following disadvantages: The main air intake pipes 33 are relatively short and difficult to be further prolonged, and therefore a sufficient inertia supercharging cannot be obtained. Additionally, since the communication passage 35 is disposed horizontal between the banks, the intake passages 36 disposed above the communication passage 35 is unavoidably raised thereby raising the overall height of the engine and deteriorating a vehicle design. Furthermore, the gathering chamber 37 cannot be expanded upwardly under the restriction of the overall height of the engine, and cannot be expanded downwardly because the communication passage 35 and the main air intake pipe 33 are disposed horizontally between the banks. Consequently, it is difficult to form the gathering chamber large in volume. As a result, a sufficient inertia charging cannot be obtained in low and medium engine speed operating ranges similarly to in the above case of difficulty of prolonging the main air intake pipe 33.

SUMMARY OF THE INVENTION

It is an object of the present invention to provide an improved intake system for a V-type internal combustion engine, which greatly contributes to improvements in vehicle design while achieving improvements in air intake characteristics.

An intake system of the present invention is for a V-type internal combustion engine having first and second banks. First and second sub-collectors are disposed above the first and second banks, respectively. Each sub-collector defines thereinside an air flow chamber which is in fluid communication with cylinders of the engine. A main collector is disposed above and between the first and second banks and defines thereinside an air flow chamber which is in fluid communication with the respective air chambers of said sub-collectors. Additionally, a throttle device is provided such that intake air flows from the main collector through the throttle device to the first and second sub-collectors. The throttle device is disposed at rear end side of the engine and arranged to control air flow from the main collector to said first and second sub-collectors.

With this configuration of the intake system, intake air passes through the main collector and reaches the main collector rear end part corresponding to the engine rear end side. Then the intake air is distributed via the throttle device to the first and second sub-collectors, and thereafter introduced into the respective cylinders of the engine. The thus configurated intake system offers the following significant advantages: By virtue of the location of the sub-collectors, the intake pipes are formed longer. Additionally, air flow passages upstream of the cylinders are considerably increased in volume by virtue of employing the main collector. These provides sufficient inertia supercharging in low and medium engine speed ranges. Since the intake arrangements for the first and second banks of the engine are symmetrically configured, the intake pipes for the first and second banks can be equalized in length, so that there is no difference in inertia supercharging in the respective cylinders thereby balancing power outputs in the respective cylinders. Furthermore, the main collector is disposed in a valley section formed by the downwardly bent portions of the intake pipes, and therefore the location of the main collector is lowered thereby contributing to lowering the overall height of the engine. Since the throttle device through which the main collector and the sub-collectors are connected is located at the engine rear end side, the engine front end side is lowered while the engine rear end side is raised and consequently the engine can be so mounted that the upper profile of the whole engine is along the engine hood line.

BRIEF DESCRIPTION OF THE DRAWINGS

In the drawings, like reference numerals designate corresponding elements and parts throughout all the figures:

FIG. 7A is a front elevation, partly in section, of a conventional V-type internal combustion engine provided with an intake system; and FIG. 7B is a plan view, partly in section, of the conventional engine of FIG. 7.

DETAILED DESCRIPTION OF THE DRAWINGS

Figure 1:
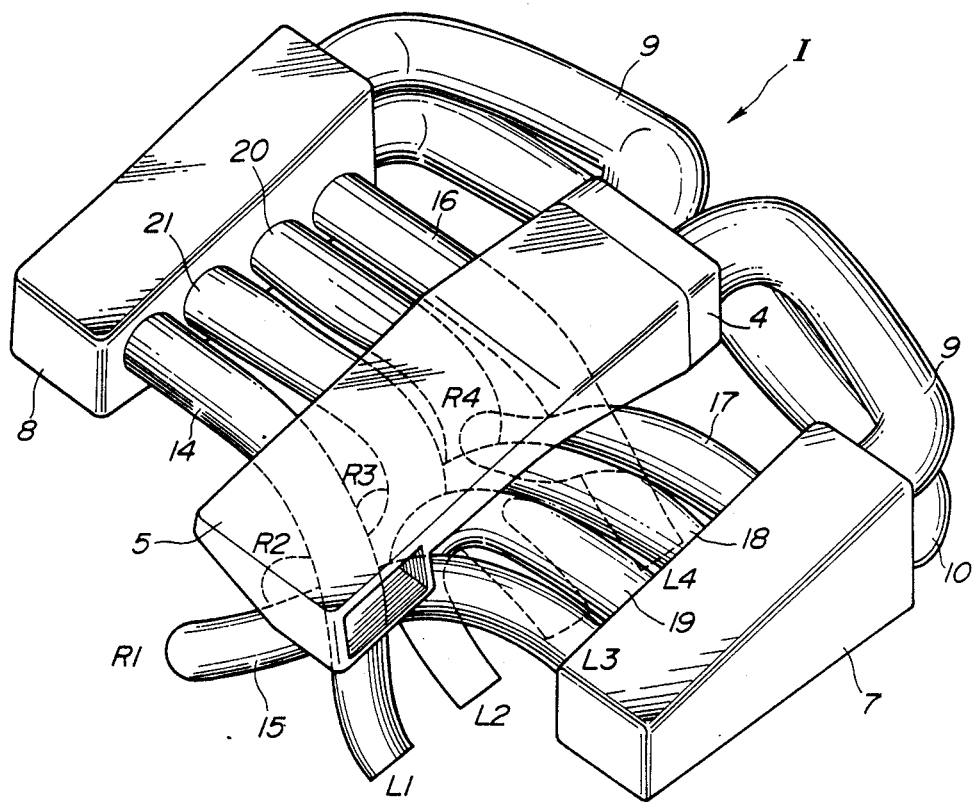
FIG. 1 is a perspective view of an intake system in accordance with the present invention.
Figure 2:
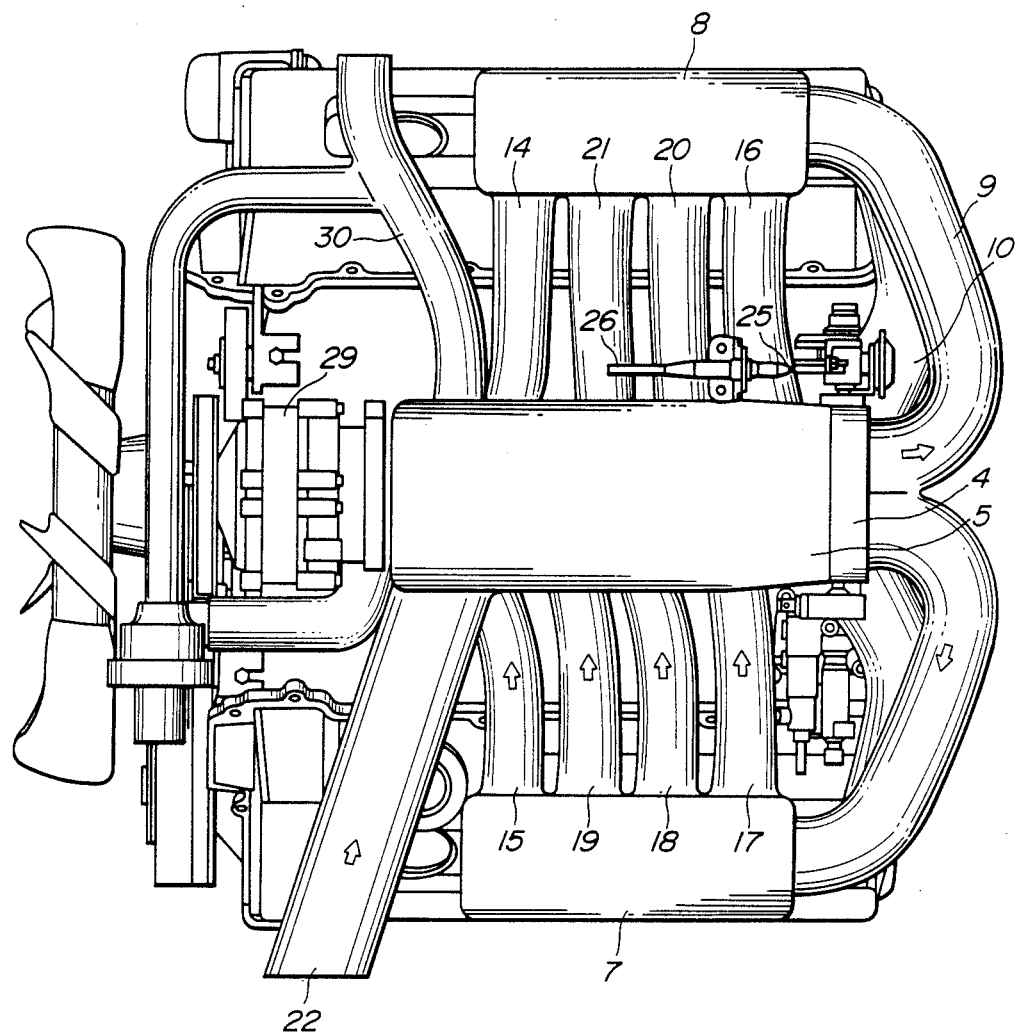
FIG. 2 is a plan view of an engine provided with the intake system of FIG. 1.

Referring now to FIGS. 1 to 6, there is shown a preferred embodiment of an intake system I of a V-type internal combustion engine in accordance with the present invention. The structure of only the intake system I is illustrated in FIG. 1, while the construction of the engine including the intake system is illustrated in FIGS. 2 to 6. The engine of this embodiment is of the gasoline-fueled and eight-cylinder type and used for an automotive vehicle. The engine includes a cylinder block C in which cylinders R1, R2, R3, R4 are located on the right side of a crankcase 1, while cylinders L1, L2, L3, L4 are located on the left side of the crankcase 1. The firing order of the respective cylinders is R1-L1-R4-L4-L3-R2-L2-R3. A pair of banks 2, 3 are disposed on the respective right and left sides of the crankcase 1 and arranged V-shaped. The banks 2, 3 are formed with intake and exhaust ports (not shown) communicable with the cylinders. A pair of sub-collectors 7, 8 are disposed above the respective banks 2, 3 and communicable with the cylinders R1, R2, R3, R4, L1, L2, L3, L4. An air flow chamber (not identified) is defined inside each sub-collector 7, 8. A main collector 5 is disposed above and between the banks 2, 3 and fluidly connectable with the sub-collectors 7, 8 through a throttle chamber device 4 disposed at the rear end part or side of the engine. An air flow chamber (not identified) is defined inside the main collector 5. The main collector 5 is supplied with intake air through an air filter (not shown). The main collector 5 and the sub-collectors 7, 8 are fluidly connectable with each other through inlet pipes 9, 9 each of which has an end section connected with the end section of the main collector 5 on the engine rear end side. The other end section of each inlet pipe 9 is connected with the end section of the sub-collector 7, 8 on the engine rear end side. The end sections of the respective sub-collectors 7, 8 on the engine area end side are fluidly connectable with each other through a variable intake pipe 10 as a communication pipe. The variable intake pipe 10 is disposed below and generally parallel with the inlet pipes 9, 9 and provided thereinside with a variable intake valve 13 located at the longitudinally intermediate part of the variable intake pipe 10. The variable intake valve 13 is arranged to open and close upon being driven by an actuator 11 which is controlled in response to the output signals from a control unit (not shown) which is supplied with output signals from an engine load sensor (not shown) and an engine speed sensor (not shown). The installation flange 12 for the actuator 11 is bolted to a bolt boss (not shown) formed in the variable intake pipe 10.

Assume that the cylinders L1, L4, R2 and R3 constitute a first group of cylinders while the cylinders R1, R4, L2 and L3 constitute a second group of cylinders. The two cylinders L1, L4 of the first group cylinders are located respectively at the front and rear end parts (corresponding to the engine rear end side) of the left side bank 2. Similarly the two cylinders R1, R4 of the second group cylinders are located respectively at the front and rear end parts (corresponding to the front and rear end sides of the engine) of the right side bank 3. The two cylinders R3, R2 of the first group of cylinders are located at the intermediate part of the right bank 3. Similarly the two cylinders L3, L2 of the second group of cylinders are located at the intermediate part of the left side bank 2.

Intake pipes 14, 15 are fluidly connectable respectively with the cylinders L1, R1 which are located respectively at the front end parts of the banks 2, 3. The intake pipes 14, 15 are fluidly connected respectively with the front end parts of the sub-collectors 8, 7 which are respectively disposed corresponding to the opposite banks 3, 2. Intake pipes 16, 17 are fluidly connectable respectively with the cylinders L4, R4 located respectively at the rear end parts of the banks 2, 3. The intake pipes 16, 17 are fluidly connected respectively with the rear end parts of the sub-collectors 8, 7. Intake pipes 18, 19 are fluidly connectable respectively with the cylinders L3, L2 located at the longitudinally intermediate part of the bank 2, and fluidly connected with the sub-collector 7 disposed corresponding to the bank 2. Intake pipes 20, 21 are fluidly connectable respectively with the cylinders R3, R2 located at the longitudinally intermediate part of the bank 3, and fluidly connected with the sub-collector 8 disposed corresponding to the bank 3. With such a connection relationship, intake air interference is prevented from occurring within the sub-collectors 7, 8.

Figure 3:
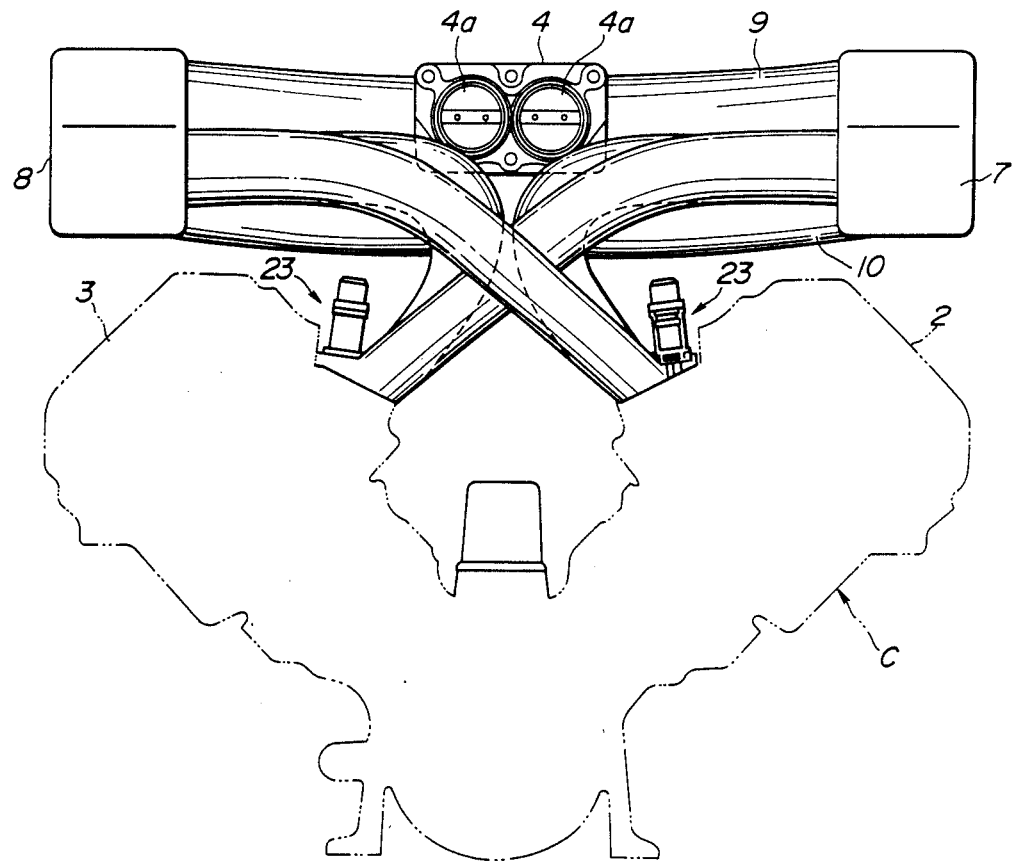
FIG. 3 is a front elevation of the intake system of FIG. 1, in a state of omitting a main collector.

The intake pipes 14 to 17 first extend generally horizontally from the inboard side walls of the sub-collectors 7, 8 toward the opposite sub-collectors 8, 7 and further extend downwardly curved to connect with the cylinders L1, R1, L4, R4, respectively. The intake pipes 18 to 21 first extend generally horizontally from the inboard side walls of the sub-collectors 7, 8 toward the opposite sub-collectors 8, 7 and further extend upon being bent generally at an angle of 180 degrees (or making a U-turn) to connect with the cylinders L3, L2, R3, R2, respectively. Accordingly, the intake pipes 14 to 17 being crossed generally X-shaped while the intake pipes 18 to 21 are formed generally along the X-shape crossing without being crossed as viewed in from the engine front side or the longitudinal direction of the engine as shown in FIG. 3.

The front and rear end parts (corresponding to the engine front and rear end sides) of the main collector 5 are formed larger in dimension in the direction of height or in the vertical direction and therefore have a larger cross-sectional area of the air flow chamber defined inside the main collector 5. The intermediate part of the main collector 5 is formed smaller in dimension in the direction of height and therefore has a smaller cross-sectional area of the air flow chamber defined inside the main collector 5. The intermediate part of the main collector 5 is located at a valley section or upper space formed by the X-shaped crossing of the intake pipes 14 to 21, while the opposite end parts of the main collector 5 are located respectively in the spaces which are located respectively forward and rearward of the intake pipes 14, 15 and the intake pipes 16, 17. The front end part (having the larger air flow chamber) of the main collector 5 is formed at its side wall with an opening (no numeral) through which the air flow chamber of the main collector 5 is communicated with an air filter (not shown). An air duct 22 is securely connected to the side wall of the main collector 5 to communicate the main collector air flow chamber and the air filter. Engine accessories, a starter motor, a water pipe, a blow-by gas hose and the like are disposed in a lower space formed below the X-shaped crossing of the intake pipes 14 to 21. Fuel injector valves 23, 23 are disposed in spaces each of which is formed between the side face of the bank 2, 3 (to which the intake pipes 14 to 21 are connected) and the curved portions of the intake pipes 15, 17, 18, 19; 14, 16, 20, 21.

Figure 4:
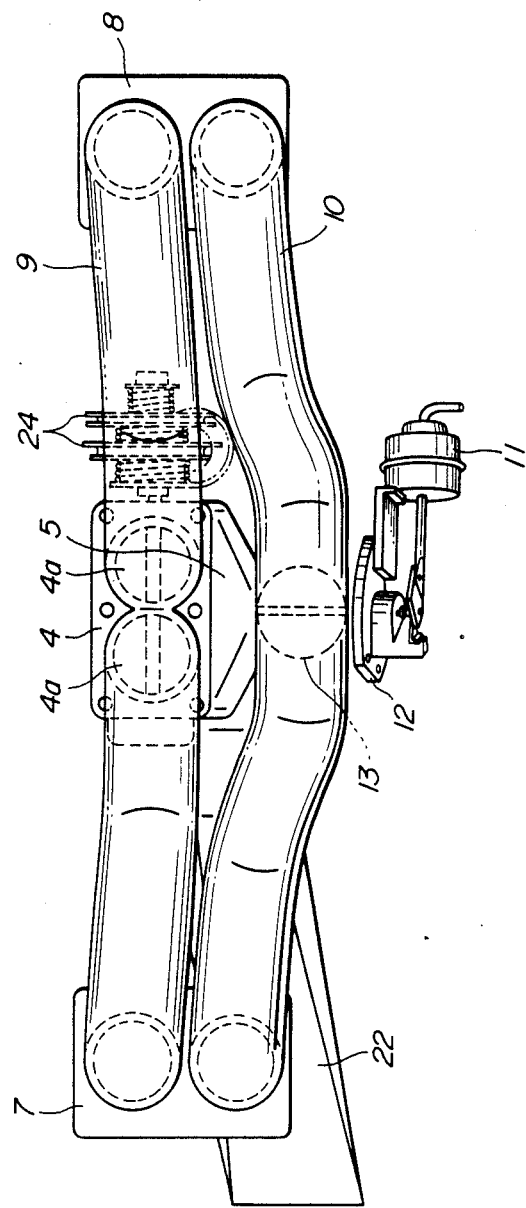
FIG. 4 is a rear elevation of the intake system of FIG. 1.

In this embodiment, a dual throttle chamber device 4 having two throttle valves 4a, 4a are used to control air amount inducted into the cylinders R1 to R4, L1 to L4. With this dual throttle chamber device 4, the intake air amounts to the respective sub-collectors 7, 8 are equally regulated thereby achieving uniform intake air distribution to the two sub-collectors 7, 8. It will be understood that if a single throttle chamber device having a single throttle valve is provided to each sub-collector 7, 8, long connecting shafts are required therefor to raise the cost of the intake system as compared with the case of using the dual throttle chamber device 4. A throttle drum 24 for driving the throttle valves 4a, 4a are fixedly disposed beside and outside the dual throttle chamber device 4 as shown in FIG. 4. A throttle wire 25 is connected to the throttle drum 24 in such a manner that the throttle drum 24 is driven by and in timed relation to an accelerator pedal. The throttle drum 24 is adapted to be rotated when the upper side thereof is pulled obliquely upwardly by the throttle wire 25 drawn from the lower side thereof as seen from FIG. 5. Upon rotation of the throttle drums 24, the throttle valves 4a, 4a are rotationally moved to open.

Figure 5:
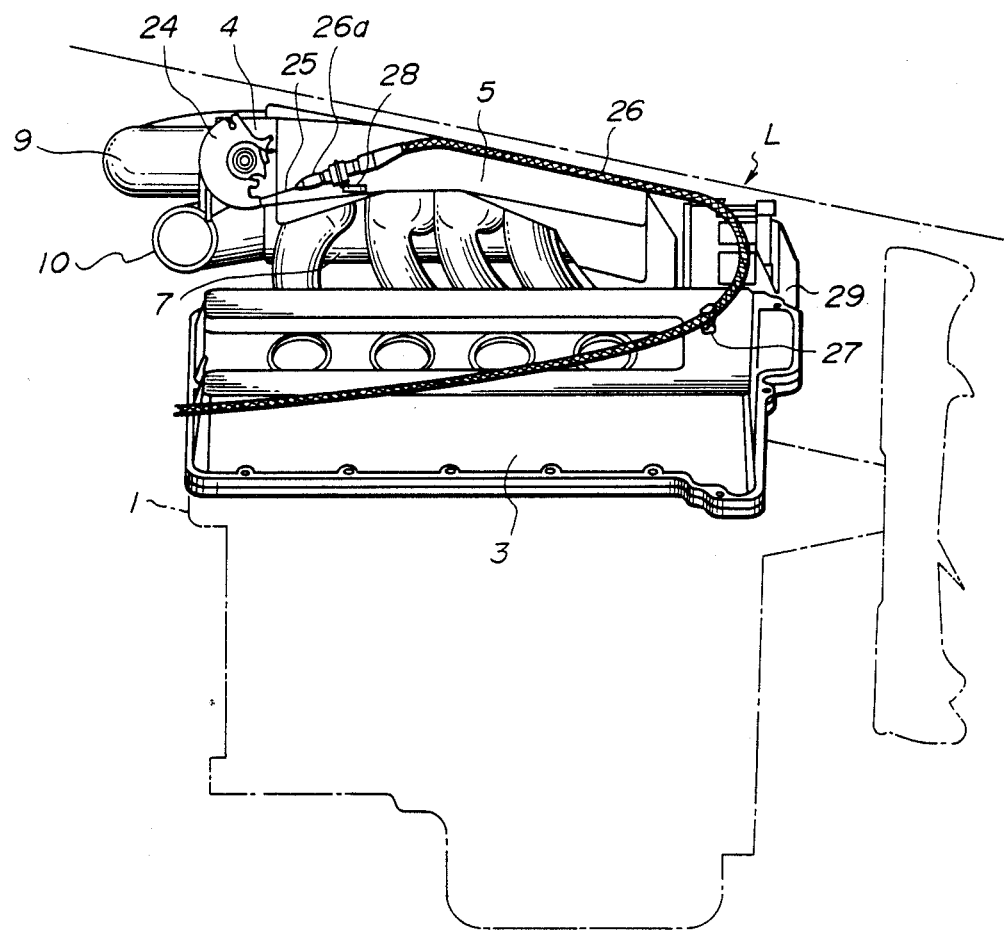
FIG. 5 is a right-side view of the engine of the FIG. 2 in a state of omitting a right sub-collector.

As shown in FIG. 5, a throttle wire boot or shield 26 covering the throttle wire 25 extends passing through between the banks 2, 3 from the rear end side of the engine toward the front end side of the engine to be turned U-shaped upon being supported by a support member 27 secured at the engine front end side, and further extends toward the rear end side of the engine along the side surface of the main collector 5, the end portion 26a of the throttle wire boot 26 being fixed to the side surface of the rear end part of the main collector 5 by means of a bracket 28. The throttle wire 25 projects from the end portion 26a of the throttle wire boot 26 and wound on the peripheral groove of the throttle drum 24 from the lower portion to reach the upper portion at which the throttle wire 25 is fixed. Accordingly, when the throttle wire 25 is pulled upon the depression operation of the accelerator pedal, the throttle drum 24 is rotated counterclockwise in FIG. 5 thereby opening the throttle valves 4a, 4a.

As seen from FIG. 5, the throttle wire 25 drawn from the lower portion of the throttle drum 24 is pulled obliquely upwardly to pull downwardly the upper portion of the throttle drum 24. This results in the following advantageous effects: The end portion 26a of the throttle wire boot 26 is directed obliquely downward in the direction toward the tip end thereof, and therefore condensed water is prevented from entering the throttle wire boot 26 through an opening (no numeral) from which the throttle wire 25 projects. This prevents failure in operation of the throttle wire 25 due to freezing of the condensed water. Additionally, not only the end portion 26a of the throttle wire boot 26 is directed obliquely downward but also the upper portion of the throttle drum 24 is adapted to be rotationally pulled downward by the throttle wire 25 drawn from the lower portion of the throttle drum 24. This lowers the layout position of the throttle wire boot 26 thereby preventing an engine hood from interferring with the throttle wire boot 26, thus contributing to lowering an engine hood line L along which the engine hood is positioned.

The operation and the advantages of the above-discussed intake system will be discussed hereinafter.

Intake air sucked through the air filter is introduced into the main collector 5 and reaches the rear end part of the main collector 5. Then the intake air flows through the throttle chamber device and is distributed to the two sub-collectors 7, 8. The thus distributed intake air is introduced from the sub-collectors 7, 8 through the intake pipes 14 to 21 to the respective cylinders R1 to R4, L1 to L4. For example in low and medium engine speed ranges, when the variable intake valve 13 in the variable intake pipe 10 is opened, the two sub-collectors 7, 8 are brought into communication with each other and therefore the sub-collectors 7, 8 and the main collector 5 function as a surge tank. Accordingly, intake air vibration occurs among the sub-collectors 7, 8, the main collector 5 and the respective cylinders, thus constituting a vibration system. It will be understood that inertia supercharging is accomplished when engine speed harmonizes or tunes with the resonance frequency of the vibration system.

In a high engine speed operating range, when the variable intake valve 13 is closed, the two sub-collectors are blocked in communication, so that the sub-collectors 7, 8 and the main collector 5 function as a resonance chamber. Accordingly, intake air vibration is made through each sub-collector 7, 8, the inlet pipe 9 and the main collector 5, between the two sub-collectors 7, 8. Consequently, when engine speed harmonizes or tunes with the resonance frequency of the whole intake system, resonance occurs thereby providing resonance supercharging.

In the above intake system, the variable intake pipe 10 connecting the two sub-collectors 7, 8 is located connected to the rear end part (corresponding to the engine rear end side) of the sub-collector 7, 8; and the intake pipes 14 to 21 extend from the sub-collectors 7, 8 disposed above the banks 2, 3 toward the respective cylinders R1 to R4 and L1 to L4. As a result, the arrangement of the intake system is not horizontal in a central part of the engine. In other words, the intake pipes 14 to 17 are crossed generally X-shaped, and the intake pipes 18 to 21 are formed along the generally X-shaped crossing. Accordingly, the location of the main collector 5 can be lowered thereby lowering the overall height of the engine.

Figure 6:
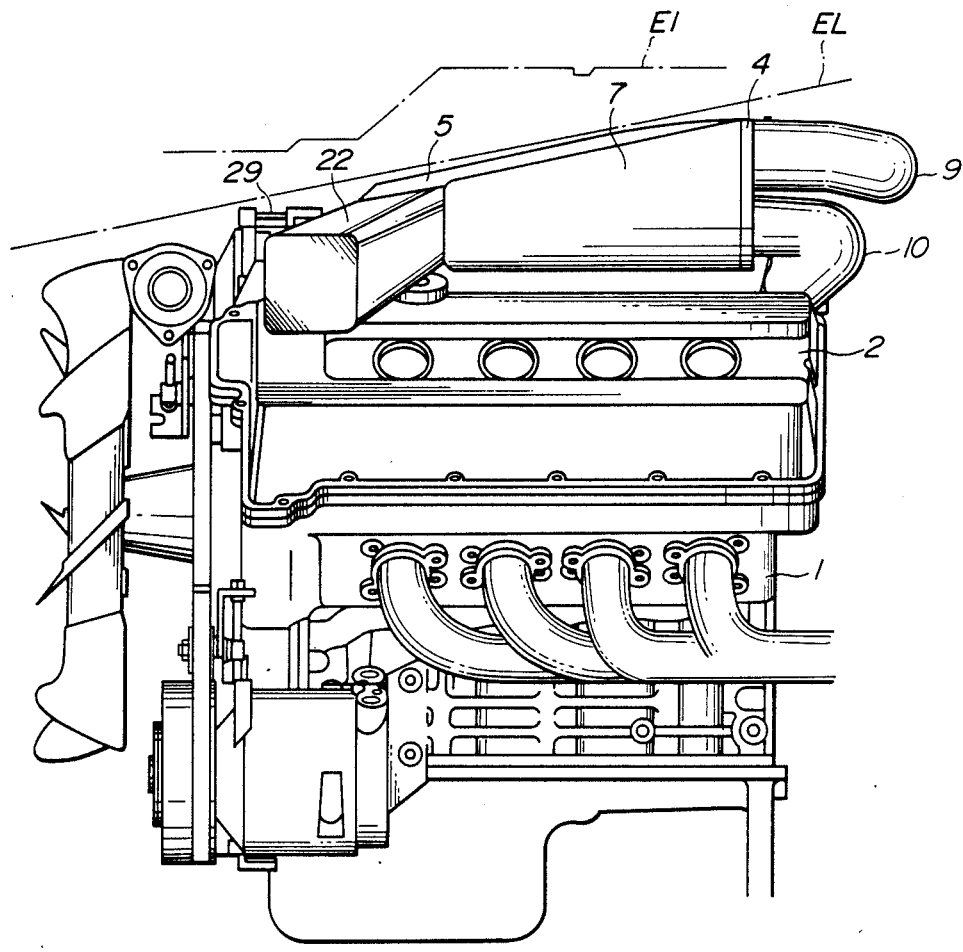
FIG. 6 is a left-side view of the engine of FIG. 2.

The opposite end parts of the main collector 5 are formed larger in dimension in the vertical direction so as to correspond in dimension to the air flow passage sectional areas of the throttle chamber device 4 and the air duct 22. The intermediate part of the main collector 5 is formed smaller in the dimension so as to have the smaller air flow passage sectional area. The intermediate part of the main collector 5 can be located at the valley section formed by the X-shaped crossing arrangement of the intake pipes 14 to 21, while the opposite end parts can be located in the spaces positioned outside the intake pipes 14, 15 and the intake pipes 16, 17 at the front and rear end sides of the engine. As a result, the height of the main collector 5 is lowered thereby greatly contributing to lowering the overall height of the engine. Accordingly, the engine hood line L can be lowered as shown in FIG. 5. Even in the case of so lowering the engine hood line, the engine hood does not interfere with the throttle wire boot 26 as a result of the above-mentioned layout of the throttle wire boot 26. This lowers the upper outline of the engine from a conventional level El to a level EL obtained by the above-arrangement of FIG. 5, as shown in FIG. 6.

Additionally, as discussed above, the intake pipes 14 to 17 are crossed generally X-shaped, and the intake pipes 18 to 21 are bent generally U-shaped, thus increasing the length of each intake pipe. Employing the main collector 5 increases the total volume of air flow passage including the intake pipes. Furthermore, the variable intake pipe 10 and the inlet pipe 9 are disposed in the rear end side of the engine to obtain a predetermined length, and therefore the length of the air flow passage formed in the whole intake system from the air filter to the cylinders can be greatly increased, thereby obtaining a sufficient inertia supercharging in the low and medium engine speed operating range.

Although the whole intake system air flow passage length is greatly increased as above, respective intake devices for the two banks 2, 3 are symmetrically arranged and therefore the lengths of the air flow passages from the air filter to the respective cylinders can be uniformed in the respective intake devices, so that there is no difference in inertia supercharging among the cylinders, thereby balancing power outputs in the respective cylinders.

.The sub-collectors 7, 8a are located above the banks 2, 3, and therefore the intake pipes are not required to be largely bent to be connected to the cylinders as compared with a case in which a sub-collector is located between banks on the assumption that the former and latter intake pipes have the same length. This achieves lowering in air flow resistance.

Since the inlet pipes 9 and the variable intake pipe 10 for connecting the sub-collectors 7, 8, the main collector 5 and the throttle chamber device 4 are located at the rear end side of the engine, the engine rear side is made high in level while the engine front side is made low in level so that the engine can be mounted along the engine hood line L. Additionally, the inlet pipe 9 and the variable intake pipe 10 are of the upper-and-lower two-stage arrangement, and therefore the dimension of the intake system in the longitudinal direction of the engine is shortened, thereby making it possible to mount the engine in a smaller engine compartment.

In connection with the above, since an ample space is formed in the front end side of the engine, installation of the air duct 22 (in FIG. 6) to the front end part side surface of the main collector 5 is facilitated. As a result, it is not required to complicate the shape of the air duct 22 and therefore the air duct 22 can be formed into a simple shape having a rectangular cross-section as shown in the drawings. This facilitates production of the air duct 22 in case the air duct is produced by a blow-molding, thereby improving productivity of the intake system. An alternater 29 can be disposed in the ample space in the engine front end side, so that cooling air flow is made effective while allowing the alternater to be large-sized.

In addition to the above advantageous effects, according to the above-discussed embodiment, by virtue of the connecting arrangement of the intake pipes, intake air interfernce within the sub-collectors 7, 8 are avoided thereby uniforming the charging air amounts to the respective cylinders, thus preventing power output lowering in a cylinder less in air supply amount while preventing failure in combustion in the cylinder. Additionally, since piping of the intake pipes 14 to 21 is arranged generally X-shaped, an ample space is formed below the thus arranged intake pipes. In this ample space, the engine accessories, the starter motor, the water pipe 30, a blow-by hose and the like are readily disposed thereby effectively using a space between the banks 2, 3. Since an ample space is formed between the bank 2, 3 at the surface receiving the intake pipes 14 to 21 and the bent sections of the intake pipes 14 to 21, the large-sized fuel injector valve 23 is readily disposed there.

While the principle of the present invention has been shown and described as being applied to the V-type gasoline-fueled eight-cylinder engine, it will be understood that the principle may be applied to a variety of V-type gasoline-fueled and diesel engines of the six-cylinder and ten-cylinder types.

What is claimed is:

1. An intake system for a V-type internal combustion engine having first and second banks, comprising:
   first and second sub-collectors disposed above the first and second banks, respectively, each sub-collector defining thereinside an air flow chamber which is in fluid communication with cylinders in the banks of the engine;
   a main collector disposed above and between the first and second banks, said main collector defining thereinside an air flow chamber in fluid communication with each sub-collector air flow chamber; and
   a throttle device through which intake air flows from said main collector to said first and second sub-collectors, said throttle device being disposed at rear end side of the engine and arranged to control air flow from said main collector to said first and second sub-collectors.

2. An intake system as claimed in claim 1, further comprising intake pipes each of which fluidly connects the air flow chamber of each sub-collector with each cylinder of the engine, each intake pipe bending downward in the direction toward the cylinder.

3. An intake system as claimed in claim 1, further comprising a first air inlet pipe through which said main collector air flow chamber is fluidly communicable with said first sub-collector air flow chamber, and a second air inlet pipe through which said main collector air flow chamber is fluidly communicable with said second sub-collector air flow chamber, said first and second air inlet pipes being disposed downstream of said throttle device.

4. An intake system as claimed in claim 3, further comprising a communication pipe through which the air flow chambers of said first and second sub-collectors are communicable with each other, and a valve controllably movably disposed inside said communication pipe to control fluid communication between said first and second sub-collectors.

5. An intake system as claimed in claim 1, wherein said first and second air inlet pipes are located at the engine rear end side.

6. An intake system as claimed in claim 5, wherein said communication pipe is located generally below said first and second air inlet pipes.

7. An intake system as claimed in claim 1, wherein said throttle device includes first and second throttle valves which respectively control air flows to said first and second sub-collectors from said main collector, said first and second throttle valves being driven by an accelerator pedal.

8. An intake system as claimed in claim 1, wherein said intake pipes are divided to first and second groups, said first group of intake pipes being connected at their first end with said first sub-collector and including at least one intake pipe whose second end is connected with the cylinder in the second bank and at least one intake pipe whose second end is connected with the cylinder in the first bank, said second group of intake pipes being connected at their first end with said second sub-collector and including at least one intake pipe whose second end is connected with the cylinder in the first bank and at least one intake pipe whose second end is connected to the cylinder in the second bank.

9. An intake system as claimed in claim 8, further comprising means for preventing interference of intake air between the cylinders to which the first group of intake pipes are connected and the cylinders to which the second group of intake pipes are connected.

10. An intake system for a V-type eight-cylinder internal combustion engine having first and second banks, comprising:
   first and second sub-collectors disposed above the first and second banks, respectively, each sub-collector defining thereinside an air flow chamber which is in fluid communication with each cylinder of the engine;
   a main collector disposed above and between the first and second banks, said main collector defining therein an air flow chamber in fluid communication with each sub-collector air flow chamber;
   a throttle device through which intake air flows from said main collector to said first and second sub-collectors, said throttle device being disposed at rear end side of the engine and arranged to control air flow from said main collector to said first and second sub-collectors;
   a first group of intake pipes which are connected with said first sub-collectors, said first group including first and second intake pipes which are connected at their first end with opposite end parts of said first sub-collector and fluidly connected at their second end with the cylinders which are located opposite end parts of the second bank, and third and fourth intake pipes which are connected at their first end with positions between said opposite end parts and fluidly connected with the cylinders which are located in an intermediate part of the first bank;
   a second group of intake pipes which are connected with said second sub-collectors, said second group including fifth and sixth intake pipes which are connected at their first end with opposite end parts of said second sub-collector and fluidly connected at their second end with the cylinders in the first bank, and seventh and eighth intake pipes which are connected at their first end with a part between said opposite end parts of said second sub-collector and fluidly connected at their second end with the cylinders which are between the cylinders to which said first and second intake pipes are connected; and
   means for preventing interference of intake air between the cylinders to which the first group of intake pipes are connected and the cylinders to which the second group of intake pipes are connected.

* * * * *